United States Patent
Bao et al.

(10) Patent No.: US 10,523,791 B2
(45) Date of Patent: Dec. 31, 2019

(54) PROTOCOL CONVERSION METHOD AND APPARATUS

(71) Applicant: Huawei Technologies Co., Ltd., Shenzhen (CN)

(72) Inventors: Shenghua Bao, Shanghai (CN); Xueguo Lian, Shanghai (CN); Tao Qu, Shanghai (CN); Xing Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/909,645

(22) Filed: Mar. 1, 2018

(65) Prior Publication Data

US 2018/0191873 A1    Jul. 5, 2018

Related U.S. Application Data

(63) Continuation of application No. PCT/CN2015/097747, filed on Dec. 17, 2015.

(51) Int. Cl.
*H04L 29/06* (2006.01)
*H04L 29/08* (2006.01)
(Continued)

(52) U.S. Cl.
CPC ............ *H04L 69/08* (2013.01); *H04L 7/0008* (2013.01); *H04L 29/08027* (2013.01);
(Continued)

(58) Field of Classification Search
CPC ..... H04L 69/08; H04L 69/324; H04L 7/0008; H04L 29/08027; H04L 61/2015; H04L 2212/00; H04W 88/08; H04W 88/085
See application file for complete search history.

(56) References Cited

U.S. PATENT DOCUMENTS 8,842,649 B2    9/2014 Liu et al.
9,668,223 B2 *  5/2017 Abdelmonem ..... H04W 52/241
(Continued)

FOREIGN PATENT DOCUMENTS

CN    10124235 A    8/2008
CN    101248689 A   8/2008
(Continued)

OTHER PUBLICATIONS

CPRI Specification V7.0, Common Public Radio Interface (CPRI); Interface Specification, Sep. 10, 2015, 128 pages.
(Continued)

*Primary Examiner* — Jenee Holland
(74) *Attorney, Agent, or Firm* — Slater Matsil, LLP

(57) ABSTRACT

Embodiments of the present invention provide a protocol conversion method and apparatus. The method includes: implementing frequency synchronization and time synchronization with a baseband unit (BBU) using an Ethernet protocol; obtaining frequency synchronization information and time synchronization information in a first format from an Ethernet interface; converting the frequency synchronization information and the time synchronization information in the first format into frequency synchronization information and time synchronization information that are in a second format, where the second format is a common public radio interface CPRI protocol format; and sending the frequency synchronization information and time synchronization information in the second format to a remote radio unit (RRU) using a CPRI interface, where the RRU supports a CPRI protocol.

20 Claims, 6 Drawing Sheets

(51) Int. Cl.
*H04L 7/00* (2006.01)
*H04L 29/12* (2006.01)
*H04W 88/08* (2009.01)

(52) U.S. Cl.
CPC ........ *H04L 61/2015* (2013.01); *H04L 69/324* (2013.01); *H04W 88/08* (2013.01); *H04W 88/085* (2013.01); *H04L 2212/00* (2013.01)

(56) References Cited

U.S. PATENT DOCUMENTS

| | | | |
|---|---|---|---|
| 2005/0107124 A1* | 5/2005 | Osterling | H04W 24/02 455/561 |
| 2007/0171866 A1* | 7/2007 | Merz | H04W 88/08 370/330 |
| 2007/0195832 A1* | 8/2007 | Liu | H04J 3/1617 370/539 |
| 2008/0225816 A1* | 9/2008 | Osterling | H04W 88/08 370/342 |
| 2008/0253280 A1* | 10/2008 | Tang | H04B 1/74 370/216 |
| 2009/0180423 A1 | 7/2009 | Kroener | |
| 2010/0067426 A1* | 3/2010 | Voschina | H04W 88/08 370/313 |
| 2012/0113972 A1 | 5/2012 | Liu et al. | |
| 2012/0184329 A1 | 7/2012 | Yu et al. | |
| 2013/0051329 A1 | 2/2013 | Take | |
| 2013/0100948 A1 | 4/2013 | Irvine | |
| 2014/0185601 A1 | 7/2014 | Ilyadis | |
| 2014/0376920 A1 | 12/2014 | Laraqui | |
| 2015/0318945 A1* | 11/2015 | Abdelmonem | H04L 5/006 370/329 |
| 2015/0365837 A1* | 12/2015 | Valasma | H04W 24/08 455/418 |
| 2017/0064661 A1* | 3/2017 | Katagiri | H04W 56/0045 |
| 2017/0156142 A1* | 6/2017 | Sato | H04W 88/08 |
| 2018/0041822 A1* | 2/2018 | Peroulas | H04Q 3/66 |
| 2018/0092066 A1* | 3/2018 | Marupaduga | H04B 7/14 |
| 2018/0139649 A1* | 5/2018 | Zhong | H04W 28/06 |
| 2018/0191873 A1* | 7/2018 | Bao | H04L 69/324 |
| 2018/0192323 A1* | 7/2018 | Zhang | H04W 88/08 |
| 2018/0242167 A1* | 8/2018 | Bottari | H04W 88/08 |
| 2018/0294827 A1* | 10/2018 | Abdelmonem | H04B 1/1036 |
| 2019/0082394 A1* | 3/2019 | Abdelmonem | H04W 24/02 |
| 2019/0098639 A1* | 3/2019 | Kubo | H04B 7/04 |

FOREIGN PATENT DOCUMENTS

| | | |
|---|---|---|
| CN | 101931454 A | 12/2010 |
| CN | 103338478 A | 10/2013 |
| CN | 103404226 A | 11/2013 |
| EP | 2273847 A1 | 1/2011 |
| WO | 2010105572 A1 | 9/2010 |
| WO | 2013007318 A1 | 1/2013 |
| WO | 2014194517 A1 | 12/2014 |

OTHER PUBLICATIONS

IEEE std 1588, IEEE Standard for a Precision Clock Synchronization Protocol for Networked Measurement and Control Systems, IEEE Instrumentation and Measurement Society, 324 pages, Jul. 24, 2908, New York, NY.

ITU-T, G.8013/Y.1731,Telecommunication Standardization Sector of ITU, Series G: Transmission Systems and Media, Digital Systems and Networks, Packet over Transport aspects—Ethernet over Transport aspects; Series Y: Global Information, Infrastructure, Internet Protocol Aspects and Next-Generation Networks, Internet protoeoi aspects—Operation, administration and maintenance; Operation, administration and maintenance (OAM) functions and mechaniams for Ethernet based networks, 102 pages, Aug. 2015.

* cited by examiner

| User plane | C&M plane | | | SYNC |
|---|---|---|---|---|
| IQ Data | CtlWord | Ethernet | HDLC | CtlWord | L1 Inband Protocol |
| Time Division Multiplexing | | | | |
| Electrical Trans | | Optical Trans | | |
FIG. 1
FIG. 2
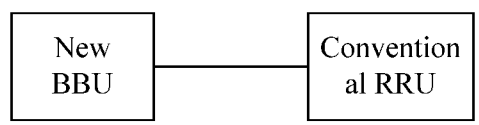
FIG. 3

PROTOCOL CONVERSION METHOD AND APPARATUS

CROSS-REFERENCE TO RELATED APPLICATIONS

This application is a continuation of International Application No. PCT/CN2015/097747, filed on Dec. 17, 2015, which is hereby incorporated by reference in its entirety.

TECHNICAL FIELD

Embodiments of the present invention relate to the field of communications technologies, and in particular, to a protocol conversion method and apparatus.

BACKGROUND

In a wireless communications system, an interface between a baseband unit (BBU) and a remote radio unit (RRU) or between different RRUs may be referred to as a radio fronthaul interface (or fronthaul interface). There are multiple types of radio fronthaul interfaces, for example, a common public radio interface (CPRI), an interface between a RRU and a BBU (IR), an Open Base Station Architecture Initiative (OBSAI) interface, and an open radio equipment interface (ORI). With rapid development of wireless technologies, to satisfy a requirement of flexible networking of BBUs and RRUs, radio over Ethernet (RoE) interfaces have been widely studied. An RoE interface is based on an Ethernet (ETH) protocol, and allows complex networking between multiple nodes in communication.

On an RoE interface-based network, a new BBU may be connected to a new RRU by using the Ethernet protocol. However, a large quantity of conventional RRUs supporting the CPRI protocol exist on a live network, and it is difficult for these conventional RRUs to be connected to the RoE interface-based network.

SUMMARY

In view of this, embodiments of the present invention provide a protocol conversion method and apparatus, to implement compatibility between an RoE interface-based network and a conventional RRU.

According to a first aspect, a protocol conversion method is provided, including: implementing, by a protocol conversion apparatus, frequency synchronization and time synchronization with a baseband unit (BBU) by using an Ethernet protocol; obtaining, by the protocol conversion apparatus, frequency synchronization information and time synchronization information from an Ethernet interface; converting, by the protocol conversion apparatus, the frequency synchronization information and the time synchronization information into frequency synchronization information and time synchronization information that are in a common public radio interface (CPRI) protocol format; and sending, by the protocol conversion apparatus, the converted frequency synchronization information and time synchronization information to a remote radio unit (RRU) by using a CPRI interface, where the RRU supports a CPRI protocol. In this solution, a protocol conversion apparatus converts synchronization information in an Ethernet protocol format into synchronization information in a CPRI protocol format and sends the synchronization information in the CPRI protocol format to a conventional RRU, so that the conventional RRU implements synchronization with a new BBU.

In a first possible implementation of the first aspect, the method further includes: scanning, by the protocol conversion apparatus, the RRU in a CPRI protocol topology scanning manner to obtain topology information of the RRU; and reporting, by the protocol conversion apparatus, the topology information to the BBU according to the Ethernet protocol. In this solution, a protocol conversion apparatus reports topology information of a conventional RRU to a new BBU by using an Ethernet message, so that the new BBU may identify the conventional RRU according to the topology information.

With reference to the first aspect or the first possible implementation of the first aspect, in a second possible implementation, the method further includes: when a slow control and management channel exists between the protocol conversion apparatus and the RRU, allocating, by the protocol conversion apparatus, a high-level data link control (HDLC) address to the RRU; initiating, by the protocol conversion apparatus, a dynamic host configuration protocol (DHCP) request on behalf of the RRU to obtain an Internet Protocol (IP) address of the RRU, and establishing a mapping relationship between the IP address and the HDLC address; and identifying, by the protocol conversion apparatus according to the mapping relationship between the IP address and the HDLC address, a control and management packet sent by the BBU to the RRU, converting the control and management packet into an HDLC packet, encapsulating the HDLC packet into a CPRI frame, and sending the CPRI frame to the RRU.

With reference to the second possible implementation of the first aspect, in a third possible implementation, the method further includes: receiving, by the protocol conversion apparatus, a CPRI frame from the RRU; and obtaining an HDLC packet from the CPRI frame, converting the HDLC packet into an Ethernet protocol packet, and sending the Ethernet protocol packet to the BBU.

With reference to the first aspect or the first possible implementation of the first aspect, in a fourth possible implementation, the method further includes: when a fast control and management channel exists between the protocol conversion apparatus and the RRU, identifying, by the protocol conversion apparatus, an Ethernet protocol control and management packet sent by the BBU to the RRU; and encapsulating, by the protocol conversion apparatus, the Ethernet protocol control and management packet into a CPRI frame, and sending the CPRI frame to the RRU.

With reference to the fourth possible implementation of the first aspect, in a fifth possible implementation, the method further includes: receiving, by the protocol conversion apparatus, a CPRI frame sent by the RRU, and parsing out an Ethernet protocol control and management packet from the CPRI frame; and sending, by the protocol conversion apparatus, the Ethernet protocol control and management packet to the BBU.

In the second to the fifth possible implementation manners, a protocol conversion apparatus may perform protocol conversion on a C&M packet, so that a new BBU exchanges control and maintenance plane data with a conventional RRU.

With reference to any one of the foregoing solutions, in a sixth possible implementation, the method further includes: receiving, by the protocol conversion apparatus from the BBU, at least one Ethernet protocol packet carrying user plane data, and identifying, according to a destination IP address carried in the Ethernet protocol packet, an Ethernet protocol packet sent to the RRU; and extracting, by the protocol conversion apparatus, a valid payload from the Ethernet protocol packet sent to the RRU, performing format conversion on the valid payload according to a CPRI protocol frame format requirement, adding, to a CPRI frame, the valid payload obtained after the format conversion, and sending the CPRI frame to the RRU.

With reference to the sixth possible implementation of the first aspect, in a seventh possible implementation, the method further includes: receiving, by the protocol conversion apparatus, a CPRI frame from the RRU, and extracting a valid payload from the CPRI frame; and adding, by the protocol conversion apparatus, the valid payload to at least one Ethernet protocol packet, and sending the at least one Ethernet protocol packet to the BBU.

In the sixth and the seventh possible implementation manners, a protocol conversion apparatus may perform protocol conversion on user plane data, so that a new BBU exchanges the user plane data with a conventional RRU.

With reference to any one of the foregoing solutions, in an eighth possible implementation, the method further includes: obtaining, by the protocol conversion apparatus, a delay from the BBU to the protocol conversion apparatus according to the Ethernet protocol; obtaining, by the protocol conversion apparatus, a delay from the protocol conversion apparatus to the RRU according to the CPRI protocol; obtaining, by the protocol conversion apparatus, a processing delay of conversion from the Ethernet protocol into the CPRI protocol; and adding up, by the protocol conversion apparatus, the delay from the BBU to the protocol conversion apparatus, the delay from the protocol conversion apparatus to the RRU, and the processing delay of conversion from the Ethernet protocol into the CPRI protocol, to obtain an end-to-end delay from the BBU to the RRU, and reporting the end-to-end delay to the BBU. In this solution, a protocol conversion apparatus may calculate an end-to-end delay from a new BBU to a conventional RRU, and report the end-to-end delay to the new BBU, to facilitate subsequent radio service processing by the new BBU.

According to a second aspect, a protocol conversion apparatus is provided, including a first transceiver unit, a processing unit, and a second transceiver unit. The first transceiver unit is configured to connect to a baseband unit (BBU) by using an Ethernet interface. The processing unit is configured to: implement frequency synchronization and time synchronization with the BBU by using an Ethernet protocol, obtain frequency synchronization information and time synchronization information from the Ethernet interface, and convert the frequency synchronization information and the time synchronization information into frequency synchronization information and time synchronization information that are in a common public radio interface (CPRI) protocol format. The second transceiver unit is configured to send the converted frequency synchronization information and time synchronization information to a remote radio unit (RRU) by using a CPRI interface, where the RRU supports a CPRI protocol. In this solution, a protocol conversion apparatus may convert synchronization information in an Ethernet protocol format into synchronization information in a CPRI protocol format and send the synchronization information in the CPRI protocol format to a conventional RRU, so that the conventional RRU implements synchronization with a new BBU.

In a first possible implementation of the second aspect, the processing unit is further configured to: scan the RRU in a CPRI protocol topology scanning manner to obtain topology information of the RRU, and report the topology information to the BBU according to the Ethernet protocol by using the first transceiver unit. In this solution, a protocol conversion apparatus may report topology information of a conventional RRU to a new BBU by using an Ethernet message, so that the new BBU can identify the conventional RRU according to the topology information.

With reference to the second aspect or the first possible implementation of the second aspect, in a second possible implementation, when a slow control and management channel exists between the protocol conversion apparatus and the RRU, the processing unit is further configured to: allocate a high-level data link control (HDLC) address to the RRU, initiate a dynamic host configuration protocol (DHCP) request on behalf of the RRU to obtain an Internet Protocol (IP) address of the RRU, establish a mapping relationship between the IP address and the HDLC address, identify, according to the mapping relationship between the IP address and the HDLC address, a control and management packet sent by the BBU to the RRU, convert the control and management packet into an HDLC packet, and encapsulate the HDLC packet into a CPRI frame. The second transceiver unit is further configured to send the CPRI frame to the RRU.

With reference to the second possible implementation of the second aspect, in a third possible implementation, the second transceiver unit is further configured to receive a CPRI frame from the RRU. The processing unit is further configured to: obtain an HDLC packet from the CPRI frame, and convert the HDLC packet into an Ethernet protocol packet. The first transceiver unit is further configured to send the Ethernet protocol packet to the BBU.

With reference to the second aspect or the first possible implementation of the second aspect, in a fourth possible implementation, when a fast control and management channel exists between the protocol conversion apparatus and the RRU, the processing unit is further configured to: identify an Ethernet protocol control and management packet sent by the BBU to the RRU, and encapsulate the Ethernet control and management packet into a CPRI frame. The second transceiver unit is further configured to send the CPRI frame to the RRU.

With reference to the fourth possible implementation of the second aspect, in a fifth possible implementation, the second transceiver unit is further configured to receive a CPRI frame sent by the RRU. The processing unit is further configured to parse out an Ethernet protocol control and management packet from the CPRI frame. The first transceiver unit is further configured to send the Ethernet protocol control and management packet to the BBU.

In the second to the fifth possible implementation manners, a protocol conversion apparatus may perform protocol conversion on a C&M packet, so that a new BBU exchanges control and maintenance plane data with a conventional RRU.

With reference to any one of the foregoing solutions, in a sixth possible implementation, the first transceiver unit is further configured to receive, from the BBU, at least one Ethernet protocol packet carrying user plane data. The processing unit is further configured to: identify, according to a destination IP address carried in the Ethernet protocol packet, an Ethernet protocol packet sent to the RRU, extract a valid payload from the Ethernet protocol packet sent to the RRU, perform format conversion on the valid payload according to a CPRI protocol frame format requirement, and add, to a CPRI frame, the valid payload obtained after the format conversion. The second transceiver unit is further configured to send the CPRI frame to the RRU.

With reference to the sixth possible implementation of the second aspect, in a seventh possible implementation, the second transceiver unit is further configured to receive a CPRI frame from the RRU. The processing unit is further configured to: extract a valid payload from the CPRI frame, and add the valid payload to at least one Ethernet protocol packet. The first transceiver unit is further configured to send the Ethernet protocol packet to the BBU.

In the sixth and the seventh possible implementation manners, a protocol conversion apparatus may perform protocol conversion on user plane data, so that a new BBU exchanges the user plane data with a conventional RRU.

With reference to any one of the foregoing solutions, in an eighth possible implementation, the processing unit is further configured to: obtain a delay from the BBU to the protocol conversion apparatus according to the Ethernet protocol, obtain a delay from the protocol conversion apparatus to the RRU according to the CPRI protocol, obtain a processing delay of conversion from the Ethernet protocol into the CPRI protocol, and add up the delay from the BBU to the protocol conversion apparatus, the delay from the protocol conversion apparatus to the RRU, and the processing delay of conversion from the Ethernet protocol into the CPRI protocol, to obtain an end-to-end delay from the BBU to the RRU. The first transceiver unit is further configured to report the end-to-end delay to the BBU. In this solution, a protocol conversion apparatus may calculate an end-to-end delay from a new BBU to a conventional RRU, and report the end-to-end delay to the new BBU, to facilitate subsequent radio service processing by the new BBU.

BRIEF DESCRIPTION OF THE DRAWINGS

FIG. 1 is an architecture diagram of a CPRI protocol in the prior art;
FIG. 2 is a diagram of a networking structure according to an embodiment of the present invention;
FIG. 3 is a diagram of another networking structure according to an embodiment of the present invention.

DETAILED DESCRIPTION OF ILLUSTRATIVE EMBODIMENTS

As shown in FIG. 1, a CPRI protocol architecture includes three planes and two layers. The three planes include a user plane, a control and management plane (C&M plane), and a synchronization (SYN) plane. The two layers are a physical layer (Layer 1, L1) and a data link layer (Layer 2, L2). User plane data includes in-phase and quadrature data (IQ data) and a control word (CtlWord) of a user. Control and management plane data includes Ethernet data, high-level data link control (HDLC) data, and a control word (CtlWord). The Ethernet data may be used for fast control and management (Fast C&M). The HDLC data may be used for slow control and management (Slow C&M). The synchronization plane may use an L1 inband protocol. L1 may mainly define a time division multiplexing feature, an electrical transmission (Electrical Trans) feature, an optical transmission (Optical Trans) feature, and the like.

When a BBU and an RRU are networked according to an Ethernet protocol, and an RRU supporting only the CPRI protocol exists on a live network, a networking scenario shown in FIG. 2 or FIG. 3 may occur. A conventional RRU supports only the CPRI protocol. Therefore, the conventional RRU may not normally communicate with a new BBU. In the subsequent embodiments of the present invention, a BBU and an RRU that support the Ethernet protocol are referred to as a new BBU and a new RRU, respectively, and an RRU supporting the CPRI protocol is referred to as a conventional RRU.

The embodiments of the present invention provide a protocol conversion method and apparatus, to implement conversion between different protocols, and to resolve the foregoing problem. In the embodiments of the present invention, the protocol conversion apparatus may be an independent device, or may be integrated into a new RRU. A conventional RRU may interwork with a new BBU or RRU using the protocol conversion apparatus. In the subsequent embodiments of the present invention, a CPRI interface is a radio fronthaul interface supporting the CPRI protocol, and an RoE interface is a radio fronthaul interface supporting the Ethernet protocol.

Figure 4:
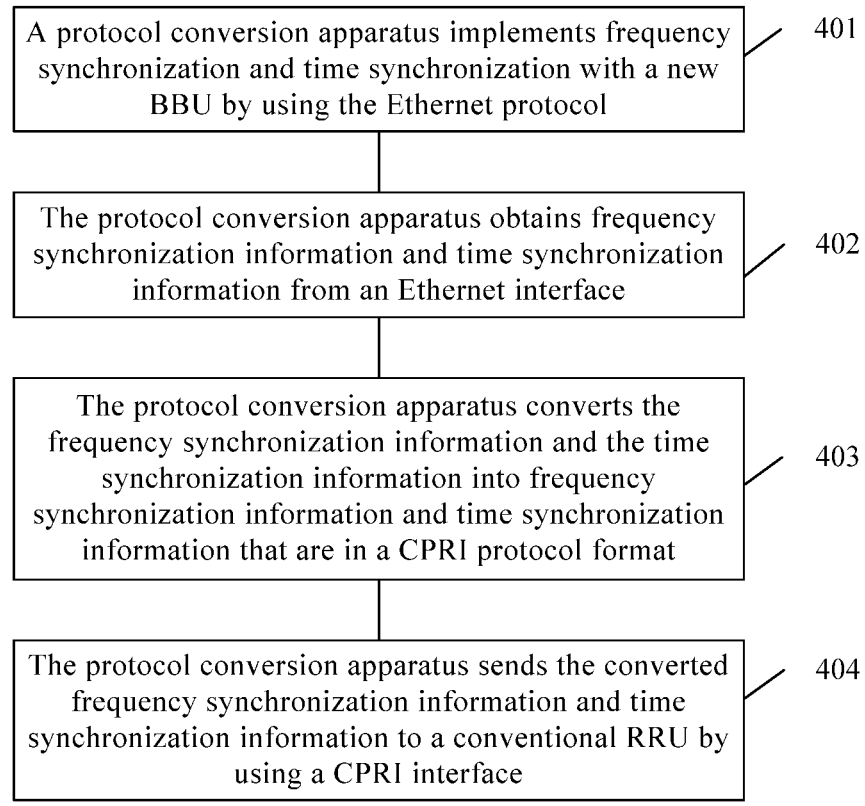
FIG. 4 is a flowchart of a protocol conversion method according to an embodiment of the present invention.

As shown in FIG. 4, an embodiment of the present invention provides a protocol conversion method, including the following steps.

401. A protocol conversion apparatus implements frequency synchronization and time synchronization with a new BBU by using the Ethernet protocol.

The protocol conversion apparatus may implement the frequency synchronization and the time synchronization with the new BBU by using a Synchronization Ethernet (SyncE) protocol and IEEE 1588, or by using only IEEE 1588.

402. The protocol conversion apparatus obtains frequency synchronization information and time synchronization information from an Ethernet interface.

403. The protocol conversion apparatus converts the frequency synchronization information and the time synchronization information into frequency synchronization information and time synchronization information that are in a CPRI protocol format.

The protocol conversion apparatus may convert, according to the CPRI protocol, the obtained frequency synchronization information and time synchronization information into the frequency synchronization information and the time synchronization information that are expected by a conventional RRU.

404. The protocol conversion apparatus sends the converted frequency synchronization information and time synchronization information to a conventional RRU by using a CPRI interface.

The frequency synchronization information may be carried in a physical layer signal, and the conventional RRU can implement the frequency synchronization without parsing a CPRI frame. The time synchronization information may be carried in a CPRI frame.

In the foregoing embodiment, a protocol conversion apparatus may convert synchronization information in an Ethernet protocol format into synchronization information in a CPRI protocol format and send the synchronization information in the CPRI protocol format to a conventional RRU, so that the conventional RRU implements synchronization with a new BBU.

Figure 5:
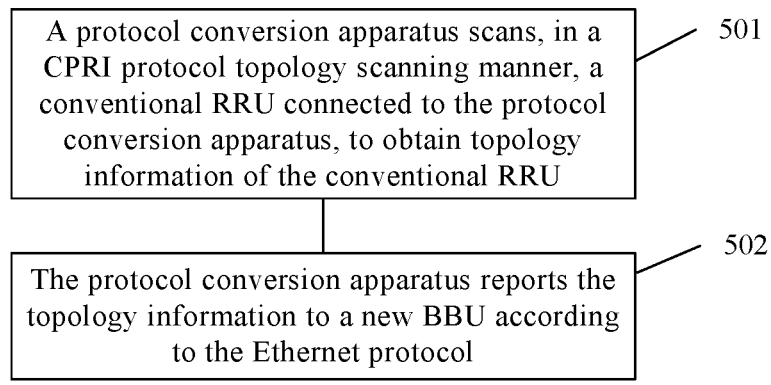
FIG. 5 is a flowchart of another protocol conversion method according to an embodiment of the present invention.

As shown in FIG. 5, an embodiment of the present invention provides another protocol conversion method, including the following steps:

501. A protocol conversion apparatus scans, in a CPRI protocol topology scanning manner, a conventional RRU connected to the protocol conversion apparatus, to obtain topology information of the conventional RRU.

502. The protocol conversion apparatus reports the topology information to a new BBU according to the Ethernet protocol.

In the foregoing embodiment, a protocol conversion apparatus may report topology information of a conventional RRU to a new BBU by using an Ethernet message, so that the new BBU can identify the conventional RRU according to the topology information.

In some embodiments, a protocol conversion apparatus may be integrated into a new RRU for topology configuration.

The new RRU may perform configuration in an RRU physical identification manner. In a radio frequency networking planning diagram, each new RRU may be numbered, and a card number (a label stuck on a SIM card) of a subscriber identity module (SIM) corresponding to each new RRU may be identified. An example rule for numbering RRUs may use site (site) number+RRU number. An RRU identification code may be prewritten into a SIM card. During on-site construction, the SIM card may be inserted into a corresponding new RRU according to a connection diagram. During site deployment, a mapping relationship between the RRU identification code and the RRU number (e.g., a cabinet number, a subrack number, and a slot number) may be downloaded on a network management platform to a base station, and the base station may configure data according to the RRU number.

An example of a command for configuring a new RRU is as follows:

ADD RRU (RRU address): CN (cabinet number)=0, SRN (subrack number)=60, SN (slot number)=0, PHYID (physical identifier)=xxxx;

The physical identifier is an RRU identification code.

A topology location of a conventional RRU based on a new RRU may be configured in a conventional configuration manner of branch chain/ring+HOP number. That is, a relative topology location of the conventional RRU may be configured based on the new RRU. A conventional RRU chain may first be configured based on a new RRU node location, and then the conventional RRU may be configured on the conventional RRU chain.

An example of commands for configuring a conventional RRU is as follows:

ADD RRUCHAIN (RRU chain/ring address): RCN (chain/ring number)=1, TT (chain/ring type)=CHAIN, HCN (cabinet number)=0, HSRN (subrack number)=60, HSN (slot number)=0, and HPN (port number)=0;

DD RRU (RRU address): CN (cabinet number)=0, SRN (subrack number)=61, SN (slot number)=0, TP (trunk or branch)=BRANCH, RCN (chain/ring number)=1, PS (Hop number)=0.

A new RRU may scan topology information of a conventional RRU chain/ring connected to the new RRU in a CPRI protocol topology scanning manner, and reports the topology information to a new BBU according to an Ethernet protocol format, so that the new BBU can identify the conventional RRU according to a branch chain/ring configuration.

In some embodiments, protocol conversion may be used to process control and management (C&M) packets. A CPRI protocol may define two C&M channels, i.e., a slow C&M channel and a fast C&M channel. Protocol conversion methods for processing C&M packets in cases of slow C&M channel and fast C&M channel are described in the following.

Figure 6:
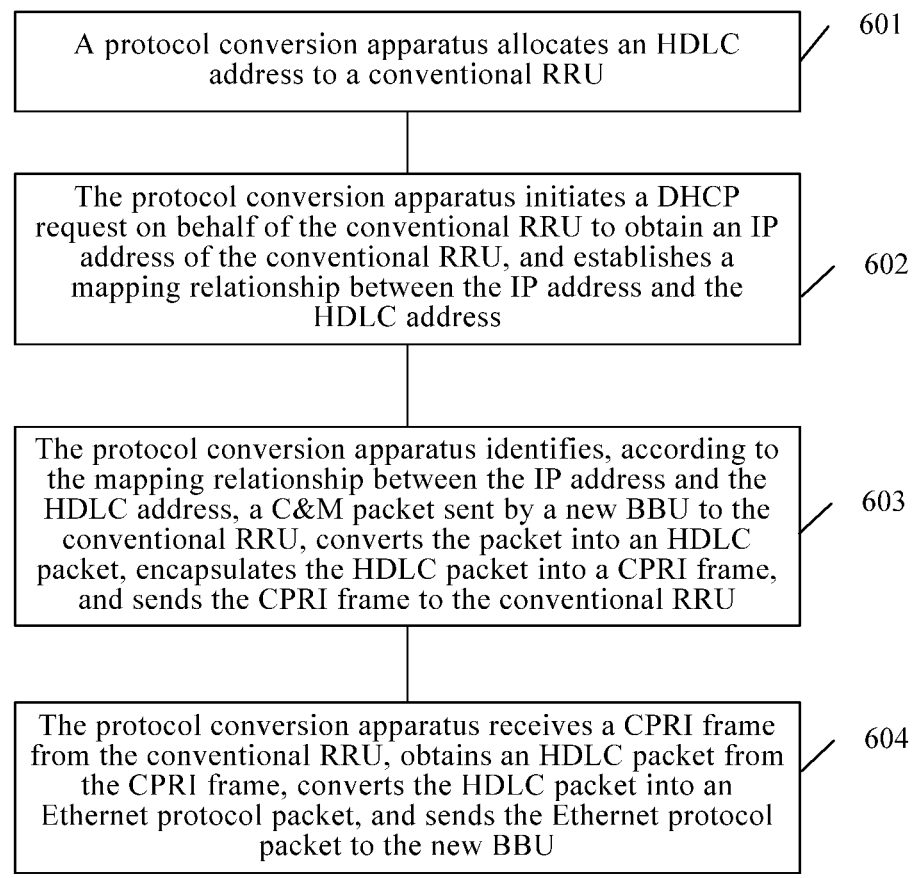
FIG. 6 is a flowchart of yet another protocol conversion method according to an embodiment of the present invention.

As shown in FIG. 6, FIG. 6 shows a protocol conversion method according to an embodiment of the present invention. In this example, a protocol conversion apparatus and a conventional RRU communicate using a slow C&M channel. The protocol conversion method includes the following steps.

601. The protocol conversion apparatus allocates an HDLC address to the conventional RRU.

602. The protocol conversion apparatus initiates a dynamic host configuration protocol (DHCP) request on behalf of the conventional RRU to obtain an Internet Protocol (IP) address of the conventional RRU, and establishes a mapping relationship between the IP address and the HDLC address.

603. The protocol conversion apparatus identifies, according to the mapping relationship between the IP address and the HDLC address, a C&M packet sent by a new BBU to the conventional RRU, converts the packet into an HDLC packet, encapsulates the HDLC packet into a CPRI frame, and sends the CPRI frame to the conventional RRU.

Step 603 is a downlink operation performed by the protocol conversion apparatus on the C&M packet. In uplink, the method may further include the following step.

604. The protocol conversion apparatus receives a CPRI frame from the conventional RRU, obtains an HDLC packet from the CPRI frame, converts the HDLC packet into an Ethernet protocol packet, and sends the Ethernet protocol packet to the new BBU.

Figure 7:
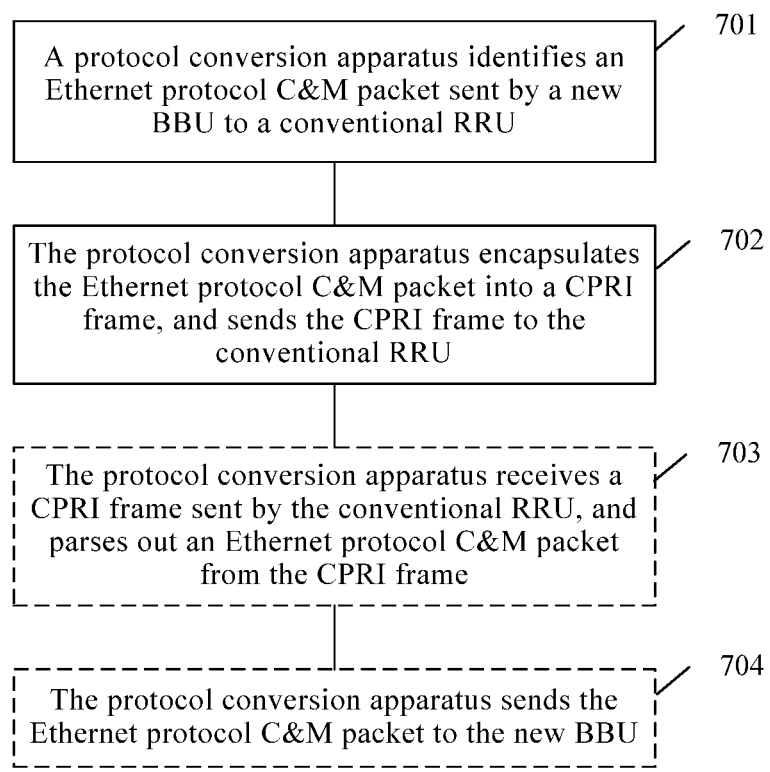
FIG. 7 is a flowchart of yet another protocol conversion method according to an embodiment of the present invention.

As shown in FIG. 7, FIG. 7 shows a protocol conversion method according to an embodiment of the present invention. In this example, a protocol conversion apparatus and a conventional RRU communicate using a fast C&M channel. The protocol conversion method may include the following steps.

701. The protocol conversion apparatus identifies an Ethernet protocol C&M packet sent by a new BBU to the conventional RRU.

702. The protocol conversion apparatus encapsulates the Ethernet protocol C&M packet into a CPRI frame, and sends the CPRI frame to the conventional RRU.

The foregoing step 701 and step 702 are downlink operations performed by the protocol conversion apparatus on the C&M packet. In uplink, the method may further include the following steps.

703. The protocol conversion apparatus receives a CPRI frame sent by the conventional RRU, and parses out an Ethernet protocol C&M packet from the CPRI frame.

704. The protocol conversion apparatus sends the Ethernet protocol C&M packet to the new BBU.

When the protocol conversion apparatus and the conventional RRU communicate using the fast C&M channel, the C&M packet may be based on the Ethernet protocol. Therefore, the conventional RRU may not need to re-apply for an IP address used to identify the conventional RRU, and the protocol conversion apparatus may only need to perform CPRI framing and deframing of the C&M packet.

In the foregoing embodiment, a protocol conversion apparatus may perform protocol conversion on a C&M packet, so that a new BBU exchanges control and maintenance plane data with a conventional RRU.

Figure 8:
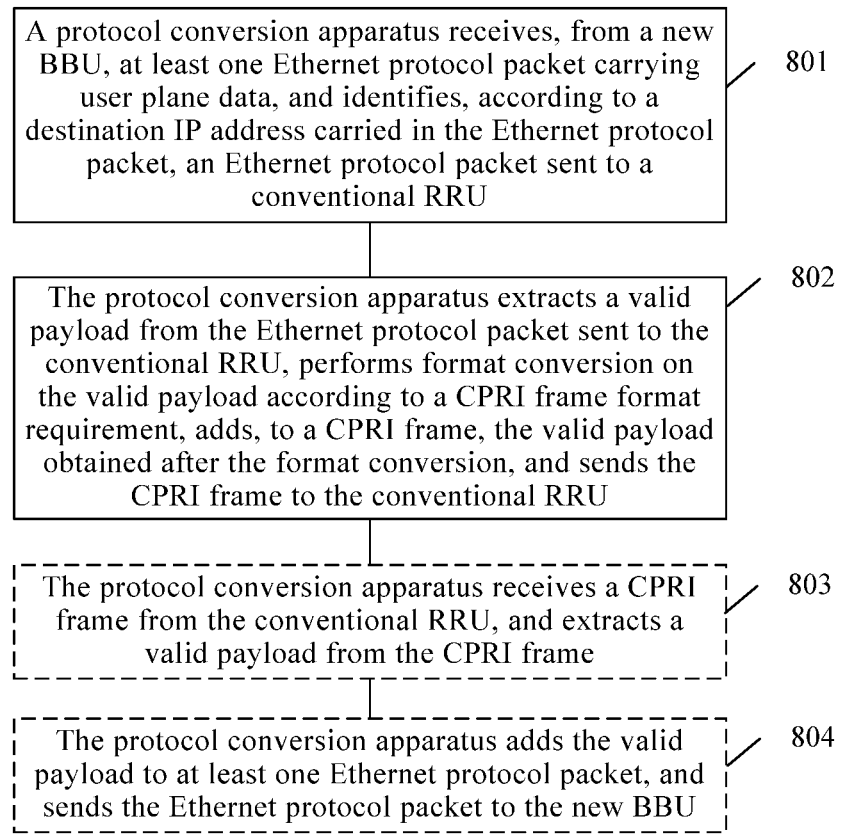
FIG. 8 is a flowchart of yet another protocol conversion method according to an embodiment of the present invention.

As shown in FIG. 8, an embodiment of the present invention provides another protocol conversion method. The method may include the following steps.

801. A protocol conversion apparatus receives, from a new BBU, at least one Ethernet protocol packet carrying user plane data, and identifies, according to a destination IP address carried in the Ethernet protocol packet, an Ethernet protocol packet sent to a conventional RRU.

When sending the user plane data to the conventional RRU, the new BBU may need to add the user plane data to one or more Ethernet protocol packets. An Ethernet protocol packet may carry a destination IP address corresponding to the conventional RRU.

802. The protocol conversion apparatus extracts a valid payload from the Ethernet protocol packet sent to the conventional RRU, performs format conversion on the valid payload according to a CPRI frame format requirement, adds, to a CPRI frame, the valid payload obtained after the format conversion, and sends the CPRI frame to the conventional RRU.

The CPRI protocol may have a format requirement on IQ data in the CPRI frame. Therefore, after the protocol conversion apparatus extracts the valid payload, format conversion on the valid payload may need to be first performed on the valid payload according to the format requirement, and the valid payload may then be carried in the CPRI frame. Step 801 and step 802 are downlink operations performed by the protocol conversion apparatus on the user plane data. In uplink, the method may further include the following steps.

803. The protocol conversion apparatus receives a CPRI frame from the conventional RRU, and extracts a valid payload from the CPRI frame.

804. The protocol conversion apparatus adds the valid payload to at least one Ethernet protocol packet, and sends the Ethernet protocol packet to the new BBU.

In the foregoing embodiment, a protocol conversion apparatus may perform protocol conversion on user plane data, so that a new BBU exchanges the user plane data with a conventional RRU.

Figure 9:
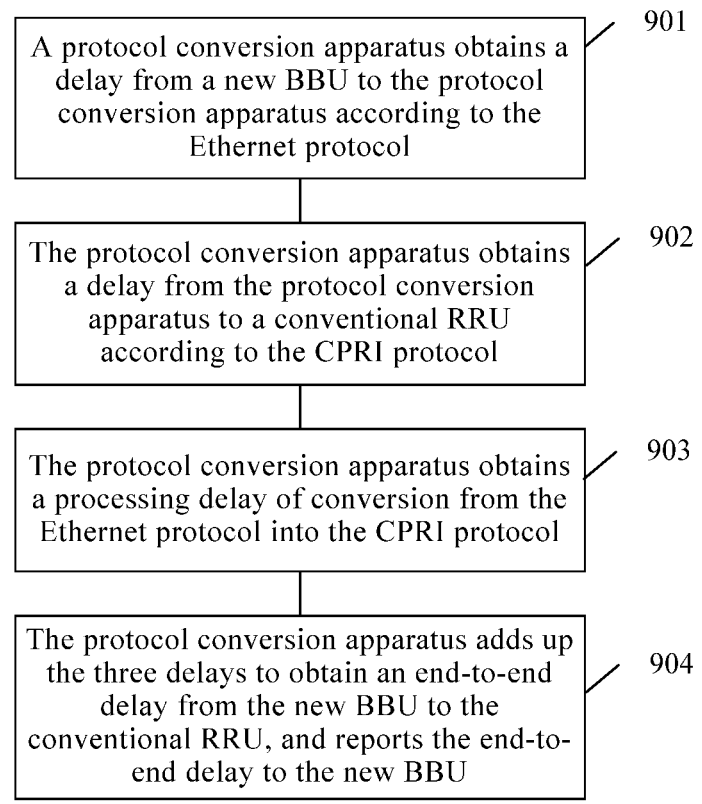
FIG. 9 is a flowchart of yet another protocol conversion method according to an embodiment of the present invention.

As shown in FIG. 9, an embodiment of the present invention provides another protocol conversion method, and the method may include the following steps.

901. A protocol conversion apparatus obtains a delay from a new BBU to the protocol conversion apparatus according to the Ethernet protocol.

902. The protocol conversion apparatus obtains a delay from the protocol conversion apparatus to a conventional RRU according to the CPRI protocol.

903. The protocol conversion apparatus obtains a processing delay of conversion from the Ethernet protocol into the CPRI protocol.

904. The protocol conversion apparatus adds up the three delays to obtain an end-to-end delay from the new BBU to the conventional RRU, and reports the end-to-end delay to the new BBU.

Figure 10:
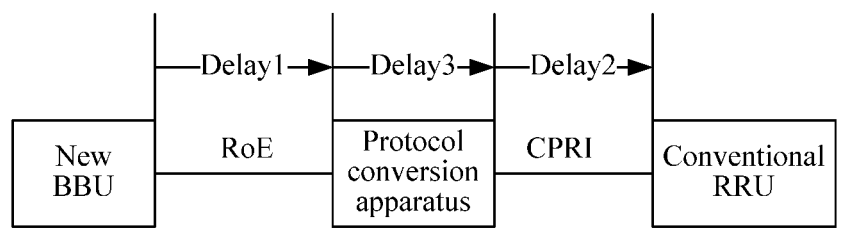
FIG. 10 is a diagram of yet another networking structure according to an embodiment of the present invention.

FIG. 10 illustrates a networking structure diagram showing a delay (i.e., Delay1) from the new BBU to the protocol conversion apparatus, a delay (i.e., Delay2) from the protocol conversion apparatus to the conventional RRU, and a processing delay (i.e., Delay3) of conversion from the Ethernet protocol into the CPRI protocol, as described in the foregoing embodiment. The networking structure shown in FIG. 10 may also be applicable to other embodiments. In the case of the Ethernet protocol, the protocol conversion apparatus may first implement synchronization with the new BBU, and add a time stamp to a service packet. After the service packet arrives at a peer end, the time stamp in the service packet may be subtracted from time of the peer end, to obtain a delay from the protocol conversion apparatus to the new BBU. In the case of the CPRI protocol, after synchronization between the protocol conversion apparatus and the conventional RRU is implemented, a loopback method may be used to measure a delay between the protocol conversion apparatus and the conventional RRU.

In the foregoing embodiment, a protocol conversion apparatus may calculate an end-to-end delay from a new BBU to a conventional RRU, and report the end-to-end delay to the new BBU, to facilitate subsequent radio service processing by the new BBU.

In this embodiment of the present invention, the end-to-end delay may be measured by another network element or another apparatus.

In this embodiment of the present invention, the protocol conversion apparatus may further identify an Ethernet interface or a CPRI interface.

Embodiments of the present invention further provide an embodiment apparatus for performing the foregoing protocol conversion methods. For specific method steps, a principle, a technical effect, and the like, references may be made to the foregoing method embodiments, and details are not described in the following.

Figure 11:
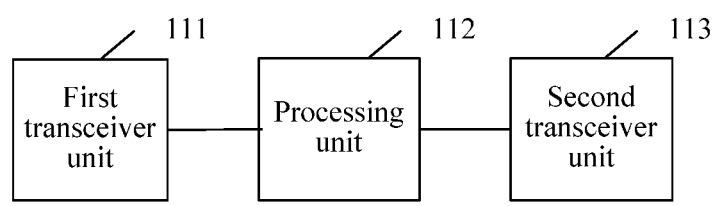
FIG. 11 is a structural block diagram of a protocol conversion apparatus according to an embodiment of the present invention.

As shown in FIG. 11, an embodiment of the present invention provides a protocol conversion apparatus, which includes a first transceiver unit 111, a processing unit 112, and a second transceiver unit 113.

The first transceiver unit 111 may be configured to connect to a new BBU by using an Ethernet interface.

The processing unit 112 may be configured to: implement frequency synchronization and time synchronization with the new BBU by using the Ethernet protocol, obtain frequency synchronization information and time synchronization information from the Ethernet interface, and convert the frequency synchronization information and the time synchronization information into frequency synchronization information and time synchronization information that are in a common public radio interface (CPRI) protocol format.

The second transceiver unit 113 may be configured to send the converted frequency synchronization information and time synchronization information to a conventional RRU by using a CPRI interface.

It should be noted that in this embodiment of the present invention, the first transceiver unit 111 may not be directly connected to the new BBU, and another device, for example, a new RRU, may exist between the protocol conversion apparatus and the new BBU.

Optionally, in this embodiment of the present invention, the processing unit 112 may further be configured to: scan the conventional RRU in a CPRI protocol topology scanning manner to obtain topology information of the conventional RRU, and report the topology information to the new BBU according to the Ethernet protocol by using the first transceiver unit 111.

Optionally, in this embodiment of the present invention, when the protocol conversion apparatus and the conventional RRU communicate using a slow C&M channel, in downlink, the processing unit 112 may be further configured to allocate a high-level data link control (HDLC) address to the conventional RRU, initiate a dynamic host configuration protocol (DHCP) request on behalf of the conventional RRU to obtain an Internet Protocol (IP) address of the conventional RRU, establish a mapping relationship between the IP address and the HDLC address, identify, according to the mapping relationship between the IP address and the HDLC address, a control and management packet sent by the new BBU to the conventional RRU, convert the control and management packet into an HDLC packet, and encapsulate the HDLC packet into a CPRI frame. The second transceiver unit 113 may further be configured to send the CPRI frame to the conventional RRU.

Optionally, in this embodiment of the present invention, in uplink, the second transceiver unit 113 may further be configured to receive a CPRI frame from the conventional RRU. The processing unit 112 may further be configured to obtain an HDLC packet from the CPRI frame, and convert the HDLC packet into an Ethernet protocol packet. The first transceiver unit 111 may further be configured to send the Ethernet protocol packet to the new BBU.

Optionally, in this embodiment of the present invention, when the protocol conversion apparatus and the conventional RRU communicate using a fast C&M channel, in downlink, the processing unit 112 may further be configured to identify an Ethernet protocol control and management packet sent by the new BBU to the conventional RRU, and encapsulate the Ethernet control and management packet into a CPRI frame. The second transceiver unit 113 may further be configured to send the CPRI frame to the conventional RRU.

Optionally, in this embodiment of the present invention, in uplink, the second transceiver unit 113 may further be configured to receive a CPRI frame sent by the conventional RRU. The processing unit 112 may further be configured to parse out an Ethernet protocol control and management packet from the CPRI frame. The first transceiver unit 111 may further be configured to send the Ethernet protocol control and management packet to the new BBU.

Optionally, in this embodiment of the present invention, with respect to user plane data, in downlink, the first transceiver unit 111 may further be configured to receive, from the new BBU, at least one Ethernet protocol packet carrying the user plane data. The processing unit 112 may further be configured to identify, according to a destination IP address carried in the Ethernet protocol packet, an Ethernet protocol packet sent to the conventional RRU, extract a valid payload from the Ethernet protocol packet sent to the conventional RRU, perform format conversion on the valid payload according to a CPRI protocol frame format requirement, and add, to a CPRI frame, the valid payload obtained after the format conversion. The second transceiver unit 113 may further be configured to send the CPRI frame to the conventional RRU.

Optionally, in this embodiment of the present invention, in uplink, the second transceiver unit 113 may further be configured to receive a CPRI frame from the conventional RRU. The processing unit 112 may further be configured to extract a valid payload from the CPRI frame, and add the valid payload to at least one Ethernet protocol packet. The first transceiver unit 111 may further be configured to send the Ethernet protocol packet to the new BBU.

Optionally, in this embodiment of the present invention, the processing unit 112 may further be configured to obtain a delay from the new BBU to the protocol conversion apparatus according to the Ethernet protocol, obtain a delay from the protocol conversion apparatus to the conventional RRU according to the CPRI protocol, obtain a processing delay of conversion from the Ethernet protocol into the CPRI protocol, add up the delay from the new BBU to the protocol conversion apparatus, the delay from the protocol conversion apparatus to the conventional RRU, and the processing delay of conversion from the Ethernet protocol into the CPRI protocol, to obtain an end-to-end delay from the new BBU to the conventional RRU.

The first transceiver unit 111 may further be configured to report the end-to-end delay to the new BBU.

It should be noted that, during specific product implementation, the first transceiver unit may be a transceiver, the second transceiver unit may be another transceiver, and the processing unit may be a processor. The protocol conversion apparatus may be one or more chips. The processor may implement a function of the processing unit by invoking an instruction stored in a memory.

Optionally, in this embodiment of the present invention, the protocol conversion apparatus may be an independent device, and an example networking structure the protocol conversion apparatus may be similar to the networking structure as shown in FIG. 10. The protocol conversion apparatus may also be integrated into a BBU or an RRU.

With descriptions of the foregoing embodiments, a person skilled in the art may clearly understand that embodiments of the present invention may be implemented by hardware, firmware or a combination thereof. When an embodiment of the present invention is implemented by software, the foregoing functions may be stored in a computer-readable medium or transmitted as one or more instructions or code in the computer-readable medium. The computer-readable medium may include a computer storage medium and a communications medium. The communications medium may include any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by an embodiment of the present invention may include a compact disc CD, a laser disc, an optical disc, a digital versatile disc (DVD), a floppy disk, and a Blu-ray disc. Generally, the disk copies data by a magnetic means, and the disc copies data optically by a laser means. The foregoing combination should also be included in the protection scope of the computer-readable medium.

In summary, what is described above is merely example embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A protocol conversion method, wherein the method comprises:
   implementing, by an apparatus, frequency synchronization and time synchronization with a baseband unit (BBU) using an Ethernet protocol;
   obtaining, by the apparatus, frequency synchronization information in a first format and time synchronization information in the first format from an Ethernet interface, wherein the first format conforms to the Ethernet protocol;
   converting, by the apparatus, the frequency synchronization information in the first format and the time synchronization information in the first format into frequency synchronization information that is in a second format and time synchronization information that is in the second format, wherein the second format conforms to a common public radio interface (CPRI) protocol; and
   sending, by the apparatus, the frequency synchronization information in the second format and time synchronization information in the second format to a remote radio unit (RRU) using a CPRI interface, for the RRU to use to synchronize with the BBU for communication between the RRU and the BBU, wherein the RRU supports the CPRI protocol.

2. The method according to claim 1, further comprising:
   scanning, by the apparatus, the RRU in a CPRI protocol topology scanning manner to obtain topology information of the RRU; and
   reporting, by the apparatus, the topology information to the BBU according to the Ethernet protocol.

3. The method according to claim 1, further comprising:
   when the apparatus and the RRU communicate using a slow control and management channel, allocating, by the apparatus, a high-level data link control (HDLC) address to the RRU;
   initiating, by the apparatus, a dynamic host configuration protocol (DHCP) request on behalf of the RRU to obtain an Internet Protocol (IP) address of the RRU, and establishing, by the apparatus, a mapping relationship between the IP address and the HDLC address; and
   identifying, by the apparatus according to the mapping relationship between the IP address and the HDLC address, a control and management packet sent by the BBU to the RRU, converting, by the apparatus, the control and management packet into a first HDLC packet, encapsulating, by the apparatus, the first HDLC packet into a first CPRI frame, and sending, by the apparatus, the first CPRI frame to the RRU.

4. The method according to claim 3, further comprising:
   receiving, by the apparatus, a second CPRI frame from the RRU; and
   obtaining, by the apparatus, a second HDLC packet from the second CPRI frame, converting, by the apparatus, the second HDLC packet into an Ethernet protocol packet, and sending, by the apparatus, the Ethernet protocol packet to the BBU.

5. The method according to claim 1, further comprising:
   when the apparatus and the RRU communicate using a fast control and management channel, identifying, by the apparatus, a first Ethernet protocol control and management packet sent by the BBU to the RRU; and
   encapsulating, by the apparatus, the first Ethernet protocol control and management packet into a first CPRI frame, and sending, by the apparatus, the first CPRI frame to the RRU.

6. The method according to claim 5, further comprising:
   receiving, by the apparatus, a second CPRI frame sent by the RRU, and parsing out, by the apparatus, a second Ethernet protocol control and management packet from the second CPRI frame; and
   sending, by the apparatus, the second Ethernet protocol control and management packet to the BBU.

7. The method according to claim 1, further comprising:
   receiving, by the apparatus from the BBU, one or more Ethernet protocol packets carrying user plane data, and identifying, by the apparatus according to a destination IP address carried in the one or more Ethernet protocol packets, a first Ethernet protocol packet from the one or more Ethernet protocol packets that is sent to the RRU; and
   extracting, by the apparatus, a first valid payload from the first Ethernet protocol packet that is sent to the RRU, performing, by the apparatus, format conversion on the first valid payload according to a CPRI protocol frame format requirement, adding, by the apparatus to a first CPRI frame, the first valid payload obtained after the format conversion, and sending, by the apparatus, the first CPRI frame to the RRU.

8. The method according to claim 7, further comprising:
   receiving, by the apparatus, a second CPRI frame from the RRU, and extracting, by the apparatus, a second valid payload from the second CPRI frame; and
   adding, by the apparatus, the second valid payload to an Ethernet protocol packet, and sending, by the apparatus, the Ethernet protocol packet to the BBU.

9. The method according to claim 1, further comprising:
   obtaining, by the apparatus, a delay from the BBU to the apparatus according to the Ethernet protocol;
   obtaining, by the apparatus, a delay from the apparatus to the RRU according to the CPRI protocol;
   obtaining, by the apparatus, a processing delay of conversion from the first format into the second format; and
   adding up, by the apparatus, the delay from the BBU to the apparatus, the delay from the apparatus to the RRU, and the processing delay of conversion from the first format into the second format, to obtain an end-to-end delay from the BBU to the RRU, and reporting, by the apparatus, the end-to-end delay to the BBU.

10. An apparatus, comprising:
    a first transceiver, configured to connect to a baseband unit (BBU) using an Ethernet interface;
    a second transceiver;
    a processor; and
    a non-transitory computer-readable storage medium storing a program to be executed by the processor, the program including instructions for:
       implementing frequency synchronization and time synchronization with the BBU using an Ethernet protocol;
    obtaining frequency synchronization information in a first format and time synchronization information in the first format from the Ethernet interface, wherein the first format conforms to the Ethernet protocol; and
       converting the frequency synchronization information in the first format and the time synchronization information in the first format into frequency synchronization information in a second format and time synchronization information in the second format, wherein the second format conforms to a common public radio interface (CPRI) protocol; and wherein the second transceiver is further configured to send the frequency synchronization information in the second format and the time synchronization information in the second format to a remote radio unit (RRU) using a CPRI interface so that the RRU can synchronize with the BBU for communication between the BBU and the RRU using the frequency synchronization information in the second format and the time synchronization information in the second format, and wherein the RRU supports the CPRI protocol.

11. The apparatus according to claim 10, wherein the program further includes instructions for:
scanning the RRU in a CPRI protocol topology scanning manner to obtain topology information of the RRU, and reporting the topology information to the BBU according to the Ethernet protocol using the first transceiver.

12. The apparatus according to claim 10, wherein the program further includes instructions for, when the apparatus and the RRU communicate using a slow control and management channel, performing the following:
allocating a high-level data link control (HDLC) address to the RRU;
initiating a dynamic host configuration protocol (DHCP) request on behalf of the RRU to obtain an Internet Protocol (IP) address of the RRU;
establishing a mapping relationship between the IP address and the HDLC address;
identifying according to the mapping relationship between the IP address and the HDLC address, a control and management packet sent by the BBU to the RRU;
converting the control and management packet into a first HDLC packet; and
encapsulating the first HDLC packet into a first CPRI frame; and
wherein the second transceiver is further configured to send the first CPRI frame to the RRU.

13. The apparatus according to claim 12, wherein the second transceiver is further configured to receive a second CPRI frame from the RRU;
wherein the program further includes instructions for obtaining a second HDLC packet from the second CPRI frame, and converting the second HDLC packet into an Ethernet protocol packet; and
wherein the first transceiver is further configured to send the Ethernet protocol packet to the BBU.

14. The apparatus according to claim 10, wherein the program further includes instructions for, when the apparatus and the RRU communicate using a fast control and management channel, identifying a first Ethernet protocol control and management packet sent by the BBU to the RRU, and encapsulating the first Ethernet protocol control and management packet into a first CPRI frame; and
wherein the second transceiver is further configured to send the first CPRI frame to the RRU.

15. The apparatus according to claim 14, wherein the second transceiver is further configured to receive a second CPRI frame sent by the RRU;
wherein the program further includes instructions for parsing out a second Ethernet protocol control and management packet from the second CPRI frame; and
wherein the first transceiver is further configured to send the second Ethernet protocol control and management packet to the BBU.

16. The apparatus according to claim 10, wherein the first transceiver is further configured to receive, from the BBU, at least one Ethernet protocol packet carrying user plane data;
wherein the program further includes instructions for identifying, according to a destination IP address carried in the at least one Ethernet protocol packet, a first Ethernet protocol packet sent to the RRU, extracting a first valid payload from the first Ethernet protocol packet sent to the RRU, performing format conversion on the first valid payload according to a CPRI protocol frame format requirement, and adding, to a first CPRI frame, the first valid payload obtained after the format conversion; and
wherein the second transceiver is further configured to send the first CPRI frame to the RRU.

17. The apparatus according to claim 16, wherein the second transceiver is further configured to receive a second CPRI frame from the RRU;
wherein the program further includes instructions for extracting a second valid payload from the second CPRI frame, and adding the second valid payload to an Ethernet protocol packet; and
wherein the first transceiver is further configured to send the Ethernet protocol packet to the BBU.

18. The apparatus according to claim 10, wherein the program further includes instructions for:
obtaining a delay from the BBU to the apparatus according to the Ethernet protocol;
obtaining a delay from the apparatus to the RRU according to the CPRI protocol;
obtaining a processing delay of conversion from the first format into the second format; and
adding up the delay from the BBU to the apparatus, the delay from the apparatus to the RRU, and the processing delay of conversion from the first format into the second format, to obtain an end-to-end delay from the BBU to the RRU; and
wherein the first transceiver is further configured to report the end-to-end delay to the BBU.

19. An apparatus, comprising:
one or more transceivers, the one or more transceivers being configured to communicate with a baseband unit (BBU) using an Ethernet protocol, and to communicate with a remote radio unit (RRU) using a common public radio interface (CPRI) protocol, wherein the RRU supports the CPRI protocol and does not support the Ethernet protocol;
a processor; and
a non-transitory computer-readable storage medium storing a program to be executed by the processor, the program including instructions for:
implementing frequency synchronization and time synchronization with the BBU using the Ethernet protocol;
obtaining frequency synchronization information in a first format and time synchronization information in the first format from an Ethernet interface, wherein the first format conforms to the Ethernet protocol;
converting the frequency synchronization information in the first format and the time synchronization information in the first format into frequency synchronization information in a second format and time synchronization information in the second format, wherein the second format conforms to the CPRI protocol; and sending, using the one or more transceivers, the frequency synchronization information in the second format and the time synchronization information in the second format to the RRU, the frequency synchronization information in the second format and the time synchronization information in the second format enabling the RRU to synchronize with the BBU for communication between the BBU and the RRU.

20. The apparatus of claim 19, wherein the program further includes instructions for:
obtaining topology information of the RRU; and
reporting the topology information to the BBU according to the Ethernet protocol so that the BBU identifies the RRU according to the topology information.

* * * * *